United States Patent
Chauhan et al.

(10) Patent No.: US 12,019,630 B2
(45) Date of Patent: Jun. 25, 2024

(54) METHOD AND SYSTEM FOR CONVERTING GRAPHQL QUERY INTO GREMLIN

(71) Applicant: INFOSYS LIMITED, Bangalore (IN)

(72) Inventors: Yashesh Chauhan, Rajkot (IN); Dharamkumar Unadkat, Bangalore (IN); Madhusudhan Aithal Mahabhaleshwara, Arlington, VA (US); Arun Bansal, Mandi Gobindgarh (IN); Aakash Sorathiya, Vadodara (IN); Priyapravas Avasthi, Bangalore (IN); Sreeram Venkatasubramanian, Chengalpattu (IN)

(73) Assignee: INFOSYS LIMITED, Bangalore (IN)

( * ) Notice: Subject to any disclaimer, the term of this patent is extended or adjusted under 35 U.S.C. 154(b) by 74 days.

(21) Appl. No.: 17/706,170

(22) Filed: Mar. 28, 2022

(65) Prior Publication Data
US 2023/0306021 A1    Sep. 28, 2023

(30) Foreign Application Priority Data
Mar. 28, 2022   (IN) .............................. 202241017978

(51) Int. Cl.
*G06F 16/2452*  (2019.01)
*G06F 16/22*    (2019.01)
*G06F 16/2453*  (2019.01)
*G06F 16/28*    (2019.01)

(52) U.S. Cl.
CPC ...... *G06F 16/2452* (2019.01); *G06F 16/2246* (2019.01); *G06F 16/24534* (2019.01); *G06F 16/288* (2019.01)

(58) Field of Classification Search
CPC ............. G06F 16/2452; G06F 16/2246; G06F 16/24534; G06F 16/288
See application file for complete search history.

(56) References Cited

U.S. PATENT DOCUMENTS

| 2018/0210966 | A1* | 7/2018 | Bedi ................... G06F 16/9024 |
| 2020/0097504 | A1* | 3/2020 | Sequeda ............... G06F 16/367 |
| 2020/0106658 | A1* | 4/2020 | A ............................. G06F 16/21 |
| 2020/0226156 | A1* | 7/2020 | Borra .................. G06F 16/9024 |

(Continued)

FOREIGN PATENT DOCUMENTS

| EP | 3629192 A1 * | 4/2020 | ............. G06F 16/21 |

OTHER PUBLICATIONS

Johnyob Alistair et al. "AppSync—Gremlin", https://github.com/johnyob/AppSync-Gremlin, 2019 (Year: 2019).*

(Continued)

*Primary Examiner* — Matthew J Ellis
(74) *Attorney, Agent, or Firm* — Troutman Pepper Hamilton Sanders LLP (Rochester)

(57) ABSTRACT

Provided is a method and system for converting graphql query into gremlin comprising microservices based architecture, that may convert a query input in a graph query language (graphql) or natural language into gremlin queries that may get executed in any graph database required by a user. Hence a user may not need to have any knowledge of the query language. In one example of the present technology, multiple gremlin supporting backend graph databases with a uniform interface may be supported, along with more than one instance of backend database in the same instance.

15 Claims, 3 Drawing Sheets

(56) References Cited

U.S. PATENT DOCUMENTS

| | | | |
|---|---|---|---|
| 2021/0034615 A1* | 2/2021 | Chen | G06F 16/2452 |
| 2021/0286848 A1* | 9/2021 | Bedi | G06F 16/2452 |
| 2022/0078149 A1* | 3/2022 | Hines | H04L 63/0428 |
| 2022/0092116 A1* | 3/2022 | Gupta | G06F 16/9024 |
| 2022/0207043 A1* | 6/2022 | Dar | G06F 16/9024 |

OTHER PUBLICATIONS

12. Stack Overflow, https://stackoverflow.com/questions/63178861/how-can-i-use-graphql-to-execute-gremlin-queries#:~:text=The%20way%20I%20have%20done,case%20it%20worked%20very%20well, "How Can I Use GraphQL to Execute Gremlin Queries?", Jul. 31, 2020 (Year: 2020).*

* cited by examiner

METHOD AND SYSTEM FOR CONVERTING GRAPHQL QUERY INTO GREMLIN

FIELD

This application claims the benefit of Indian Patent Application No. 202241017978, filed 28 Mar. 2022, which is incorporated by reference in its entirety.

The present disclosure relates to generating a database query that is agnostic of the graph database. More precisely it relates to accessing one or more graph database that supports gremlin.

BACKGROUND

Most organization data can be represented in the form of entities connected by relationships. The entities and relationships together with the associated properties form a property graph. Property graphs are typically stored in Graph databases.

Graph databases are popularly used to store and analyze connected data. The analysis along with validation methods of these databases are majorly dependent on the graph database. Hence a dedicated platform or query for each database is needed. It becomes difficult to perform the required processing or analysis independent of the underlying graph database. Users are also required to have a knowledge of the query language.

Provided is an example of a method for converting graphql query into gremlin, comprising creating schema of one or more gremlin supported graph database, receiving as input the created schema and a data query for the graph database by a user, parsing the received schema and the received data query. It further includes mapping the fields of the parsed schema and the parsed query, and identifying one or more entities based on the mapping, and creating a gremlin query using the identified entities.

Provided is an example of a graph database accessing system for converting graphql query into gremlin, comprising a schema creator for creating schema of one or more gremlin supported graph database, a UI component for receiving as input the created schema and a data query for the graph database by a user. Also provided is a gremling transpiler component for parsing the received schema and the received data query, mapping the fields of the parsed schema and the parsed query, and identifying one or more entities based on the mapping; and creating a gremlin query using the identified entities.

Provided is an example of a computer program product comprising a computer-readable storage media having computer-executable instructions stored thereupon, which when executed by a processor cause the processor to perform a method for converting graphql query into gremlin, comprising creating schema of one or more graph database, receiving as input the created schema and a data query for the graph database by a user, parsing the received schema and the received data query, mapping the fields of the parsed schema and the parsed query, and identifying one or more entities based on the mapping. It also includes creating a gremlin query using the identified entities.

DETAILED DESCRIPTION

In an example the present disclosure provides a microservices based architecture, that may convert a query input in a graph query language (graphql) e into gremlin queries that may get executed in any graph database required by a user. Hence a user may not need to have any knowledge of the query language. In one example of the present technology, multiple gremlin supporting backend graph databases with a uniform interface may be supported.

Figure 1:
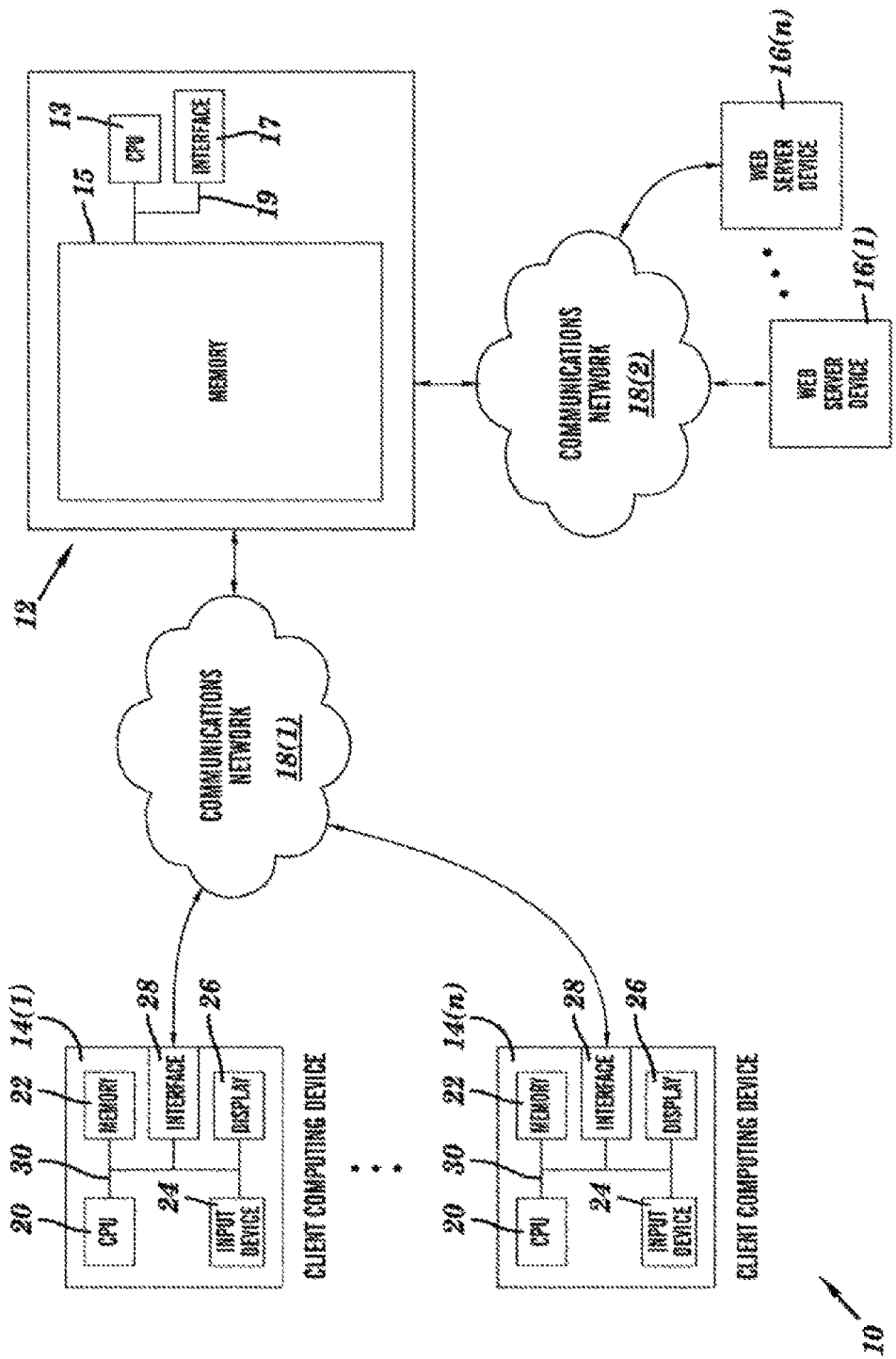
FIG. 1 provides an example of a computing environment to implement the present technology.

An exemplary environment 10 with a graph database accessing system 12 configured to access graph database is illustrated in FIG. 1. Although this technology can be implemented on other types of devices, such as one of the web server devices 16(1)-16(n), or any other server computing apparatus configured to receive and process hypertext transfer protocol (HTTP) requests, by way of example only. The exemplary environment 10 includes a graph database accessing system 12, client devices 14(1)-14(n), the web server devices 16(1)-16(n), and communication networks 18(1)-18(2), although other numbers and types of systems, devices, and/or elements in other configurations and environments with other communication network topologies can be used. This technology provides several advantages including providing a method, computer readable medium and an apparatus that can provide access to multiple graph database.

Referring more specifically to FIG. 1, the graph database accessing system 12 may include a central processing unit (CPU) or processor 13, a memory 15, and an interface system 17 which are coupled together by a bus 19 or other link, although other numbers and types of components, parts, devices, systems, and elements in other configurations and locations can be used. The processor 13 in the graph database accessing system 12 executes a program of stored instructions for one or more aspects of the present disclosure as described and illustrated by way of the examples herein, although the processor could execute other numbers and types of programmed instructions.

The memory 15 in the graph database accessing system 12 stores these programmed instructions for one or more aspects of the present invention as described and illustrated herein, although some or all of the programmed instructions could be stored and/or executed elsewhere. A variety of different types of memory storage devices, such as a random access memory (RAM) or a read only memory (ROM) in the system or a floppy disk, hard disk, CD ROM, DVD ROM, or other computer readable medium which is read from and/or written to by a magnetic, optical, or other reading and/or writing system that is coupled to the processor 13, can be used for the memory 15 in the graph database accessing system 12.

The interface system 17 in the graph database accessing system 12 is used to operatively couple and communicate between the graph database accessing system 12 and the client devices 14(1)-14(n) and the web server devices 16(1)-16(n) via the communication networks 18(1) and 18(2), although other types and numbers of communication networks with other types and numbers of connections and configurations can be used. By way of example only, the communication networks 18(1) and 18(2) can use TCP/IP over Ethernet and industry-standard protocols, including HTTP, HTTPS, WAP, and SOAP, although other types and numbers of communication networks, such as a direct connection, a local area network, a wide area network, modems and phone lines, e-mail, and wireless and hardwire communication technology, each having their own communications protocols, can be used.

Each of the client devices 14(1)-14(n) enables a user to request, receive, and interact with web pages from one or more web sites hosted by the web server devices 16(1)-16(n) through the graph database accessing system 12 via one or more communication networks 18(1). Although multiple client devices 14(1)-14(n) are shown, other numbers and types of user computing systems could be used. In one example, the client devices 14(1)-14(n) comprise smart phones, personal digital assistants, computers, or mobile devices with Internet access that permit a website form page or other retrieved web content to be displayed on the client devices 14(1)-14(n).

Each of the client devices 14(1)-14(n) in this example is a computing device that includes a central processing unit (CPU) or processor 20, a memory 22, user input device 24, a display 26, and an interface system 28, which are coupled together by a bus 30 or other link, although one or more of the client devices 14(1)-14(n) can include other numbers and types of components, parts, devices, systems, and elements in other configurations. The processor 20 in each of the client devices 14(1)-14(n) executes a program of stored instructions for one or more aspects of the present invention as described and illustrated herein, although the processor could execute other numbers and types of programmed instructions.

The memory 22 in each of the client devices 14(1)-14(n) stores these programmed instructions for one or more aspects of the present invention as described and illustrated herein, although some or all of the programmed instructions could be stored and/or executed elsewhere. A variety of different types of memory storage devices, such as a random access memory (RAM) or a read only memory (ROM) in the system or a floppy disk, hard disk, CD ROM, or other computer readable medium which is read from and/or written to by a magnetic, optical, or other reading and/or writing system that is coupled to processor 20 can be used for the memory 22 in each of the client devices 14(1)-14(n).

The user input device 24 in each of the client devices 14(1)-14(n) is used to input selections, such as requests for a particular website form page or to enter data in fields of a form page, although the user input device could be used to input other types of data and interact with other elements. The user input device can include keypads, touch screens, and/or vocal input processing systems, although other types and numbers of user input devices can be used.

The display 26 in each of the client devices 14(1)-14(n) is used to show data and information to the user, such as website or application page by way of example only. The display in each of the client devices 14(1)-14(n) can be a mobile phone screen display, although other types and numbers of displays could be used depending on the particular type of client device 14(1)-14(n).

The interface system 28 in each of the client devices 14(1)-14(n) is used to operatively couple and communicate between the client devices 14(1)-14(n), the database accessing system 12, and the web server devices 16(1)-16(n) over the communication networks 18(1) and 18(2), although other types and numbers of communication networks with other types and numbers of connections and configurations can be used.

The web server devices 16(1)-16(n) provide web content such as one or more pages from one or more web sites for use by one or more of the client devices 14(1)-14(n) via the graph database accessing system 12, although the web server devices 16(1)-16(n) can provide other numbers and types of applications and/or content and can provide other numbers and types of functions. Although the web server devices 16(1)-16(n) are shown for ease of illustration and discussion, other numbers and types of web server systems and devices can be used.

Each of the web server devices 16(1)-16(n) include a central processing unit (CPU) or processor, a memory, and an interface system which are coupled together by a bus or other link, although each of the web server devices 16(1)-16(n) could have other numbers and types of components, parts, devices, systems, and elements in other configurations and locations. The processor in each of the web server devices 16(1)-16(n) executes a program of stored instructions one or more aspects of the present invention as described and illustrated by way of the examples herein, although the processor could execute other numbers and types of programmed instructions.

The memory in each of the web server devices 16(1)-16(n) stores these programmed instructions for one or more aspects of the present invention as described and illustrated by way of the examples described and illustrated herein, although some or all of the programmed instructions could be stored and/or executed elsewhere. A variety of different types of memory storage devices, such as a random access memory (RAM) or a read only memory (ROM) in the system or a floppy disk, hard disk, CD ROM, DVD ROM, or other computer readable medium which is read from and/or written to by a magnetic, optical, or other reading and/or writing system that is coupled to the processor, can be used for the memory in each of the web server devices 16(1)-16(n).

The interface system in each of the web server devices 16(1)-16(n) is used to operatively couple and communicate between the web server devices 16(1)-16(n), the graph database accessing system 12, and the client devices 14(1)-14(n) via the communication networks 18(1) and 18(2), although other types and numbers of communication networks with other types and numbers of connections and configurations can be used.

Although examples of the graph database accessing system 12, the client devices 14(1)-14(n), and the web server devices 16(1)-16(n), are described and illustrated herein, each of the client devices 14(1)-14(n), the graph database accessing system 12, and the web server devices 16(1)-16(n), can be implemented on any suitable computer system or computing device. It is to be understood that the devices and systems of the examples described herein are for exemplary purposes, as many variations of the specific hardware and software used to implement the examples are possible, as will be appreciated by those skilled in the relevant art(s).

Furthermore, each of the systems of the examples may be conveniently implemented using one or more general purpose computer systems, microprocessors, digital signal processors, and micro-controllers, programmed according to the teachings of the examples, as described and illustrated herein, and as will be appreciated by those ordinary skill in the art.

In addition, two or more computing systems or devices can be substituted for any one of the systems in any of the examples. Accordingly, principles and advantages of distributed processing, such as redundancy and replication also can be implemented, as desired, to increase the robustness and performance of the devices and systems of the examples. The examples may also be implemented on computer system or systems that extend across any suitable network using any suitable interface mechanisms and communications technologies, including by way of example only telecommunications in any suitable form (e.g., voice and modem), wireless communications media, wireless communications networks, cellular communications networks, G3 communications networks, Public Switched Telephone Network (PSTNs), Packet Data Networks (PDNs), the Internet, intranets, and combinations thereof.

The examples may also be embodied as a non-transitory computer readable medium having instructions stored thereon for one or more aspects of the present invention as described and illustrated by way of the examples herein, as described herein, which when executed by a processor, cause the processor to carry out the steps necessary to implement the methods of the examples, as described and illustrated herein.

Figure 2:
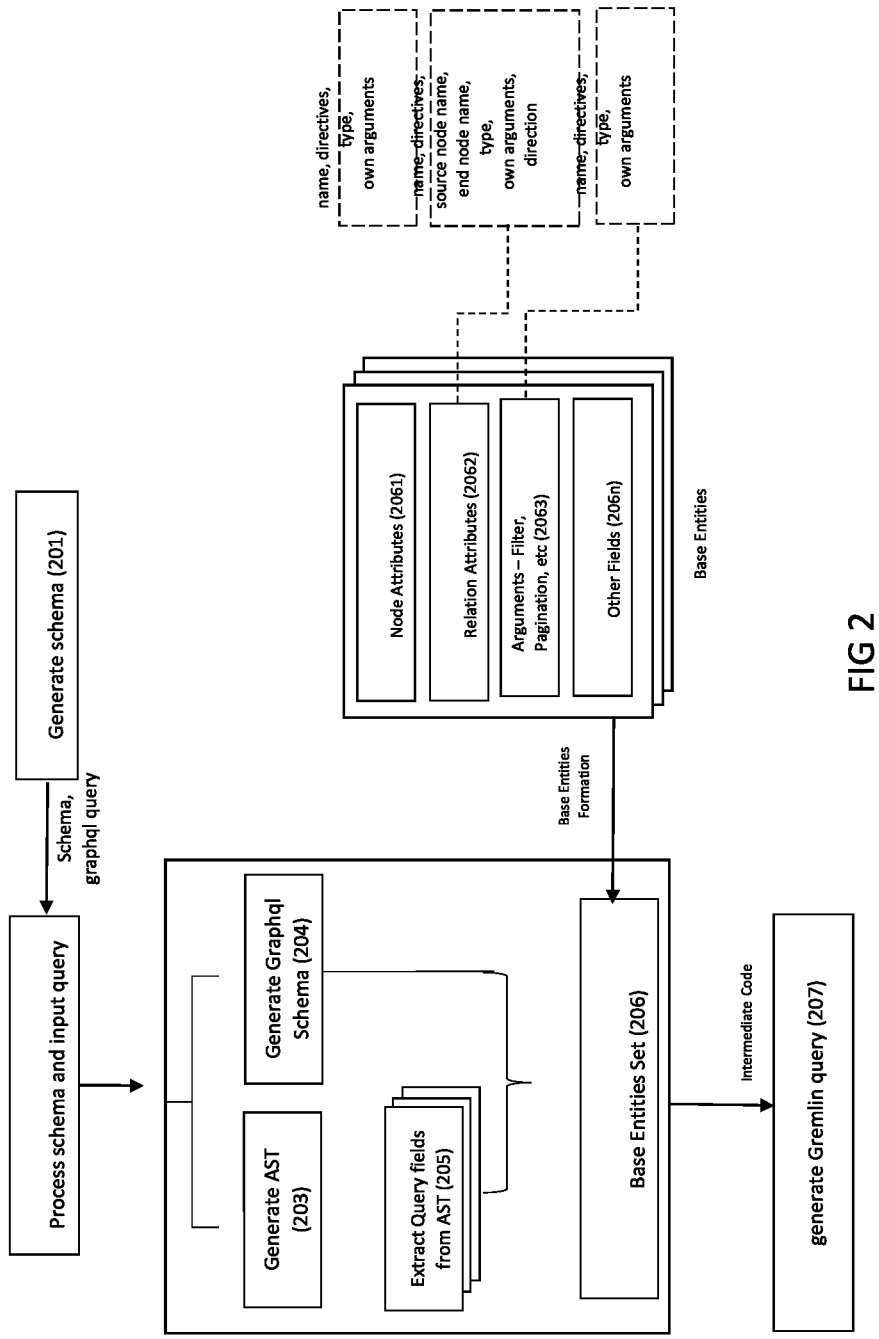
FIG. 2 provides an example of a process to implement the present technology.

An example of the process to implement the present technology will now be explained along with the description of FIG. 2. In an example, a user may need access to one or more graph database that support gremlin. This may be any of the gremlin supported graph databases, for instance JanusGraph. As an initial step, a schema may be generated by the graph database accessing system, for the gremlin supported multiple graph database that a user wants to access (201). The schema may be generated using any appropriate technology, for instance schema inference, by directly running necessary queries to database. In an example, schema may be generated for the database available in the environment where the present technology is implemented and configured. If the present technology is implemented in a cloud environment of an organization, schema may be generated for all database provided in that cloud.

The generated schema may have information about nodes, relation between nodes, their properties, datatypes along with other related parameters and factors.

In an example, when a user has to access a graph database, it may provide a database query as per requirement. The database query may be a natural language query. The natural language query may be converted to graphql using an appropriate technology. The schema created by the system and the user queries maybe provided as input to the system.

In an example, the received inputs may be analyzed for parsing the user query to generate an abstract syntax tree (AST) (203). In one example, AST may be generated by parsing the user query. The AST may have information regarding the user query. It may have type definitions along with arguments mentioned in user query. In an example, any other process for generating the required intermediate representation of a query may be used. This may enable checking the query for any errors.

In one example, analyzing the input may include parsing the schema received as input, and a parsed schema may be generated from the raw schema in any native language (204). In an example the parsed schema may enable ensuring that the parsed user query is right and can be run against the gremlin supported graph database to receive data. The user query can be validated using the parsed schema. The field name and other attributes of the query can be verified and corrected, by matching it with the fields of the schema. The parsed schema may have type definition along with arguments mentioned schema.

In one example, once the parsing is done, the AST may be processed to extract the query fields which were there in the user query (205). As explained in earlier paragraph, the AST may have the definitions as present in the user query.

The extracted definitions and the parsed schema may be mapped and used to create a base entity set (206). In one example, the base entity set may have details of the entities, and the relationships. The details may be categorized into node attribute (2061), relation attribute (2062), arguments (2063), or other appropriate information and query fields as extracted from the user query. The base entity set may be created by mapping the extracted definitions and the parsed schema.

In an example, node attribute may relate to names, type of queries. It may have information about node type which is being defined in query. Specifically, it may have node type name, node directives, node name, node arguments.

In an example, relation attribute may relate to the relation type which is being defined in query. Specifically, it will have relation type name, relation directives, relation name, relation arguments, source node name, destination node name, direction (IN, OUT).

In an example, arguments may relate to information about all the other arguments that have been defined within query for instance filter arguments which provide details about which operators have been used, pagination arguments that may include, how many nodes user wants to fetch, and from which node index user wants to fetch data.

In an example, some of the extracted fields may be categorized in multiple attributes, for instance as node attribute as well as relation attribute, or any other attribute. In an example, the base entity may have other categorized details as well.

In an example, once the base entity set is created having the mapping of above explained attributes with the schema, it can be used to create a database agnostic query (207). A query builder may scan and analyze all the entries of the base entity set and the intermediate code. It may create equivalent sub parts to take care of all nodes, arguments, relations, values, and the user query. It may convert them to gremlin equivalent part, and all the parts as per the configuration and settings, may be merged appropriately to create a gremlin query. Accordingly, the present disclosure may enable accessing multiple backend gremlin supported graph databases with a uniform interface.

Figure 3:
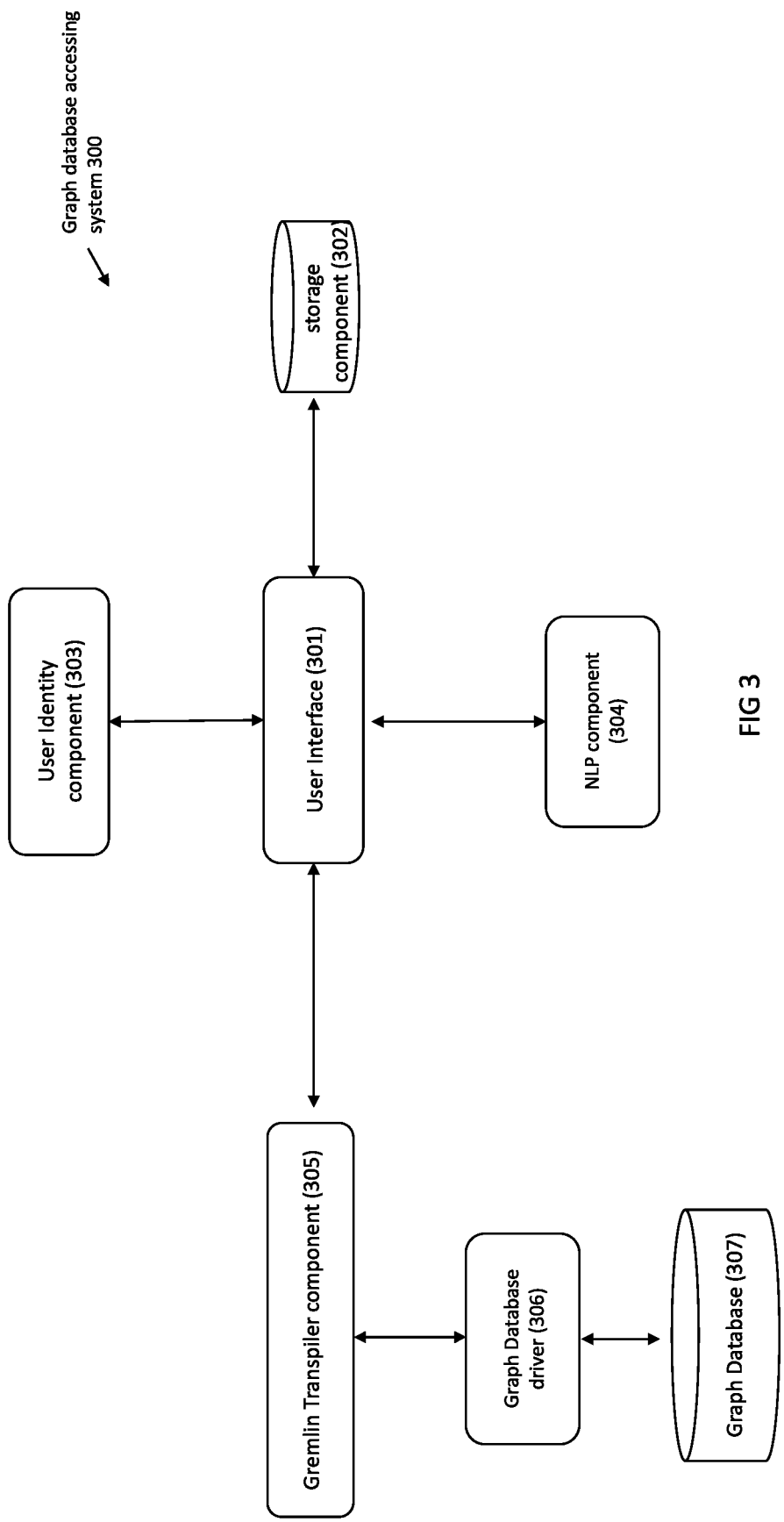
FIG. 3 provides an example of a system to implement the present technology.

An example of the architecture to implement the present disclosure will now be explained along with FIG. 3.

In one example, the database accessing system 300 may comprise of a User Interface (UI) component (301). The UI may be configured to receive inputs for accessing a graph database. The input may be a user query in natural language, or in graph query language (graphQL). Once the user interface sends the user query, it also sends a schema of the available databases.

In an example the UI component may be connected to a storage component (302). The storage component may be configured to store the schemas of the graph databases, user settings, user profiles and other such details. The UI component may access the required schema from the storage component and transmit it forward.

In an example, the UI component may be connected to a user identity component (303). The user identity component may be used to authenticate the user who is trying to access the graph database. Once a user accesses the UI component, the user details may be passed on to the user identity component. An authorization token maybe generated based on the user identity. Other known ways of user identity and authentication may also be used. Various type of access control can also be configured based on the user profile provided by the user identity component.

In an example, the UI component may be connected to an NLP component (304). The NLP component receives the natural language user query entered by the user. It may be processed using any appropriate language processing method and converted to a graphql. The graphql is then forwarded to the UI component.

In one example, once the UI component has accessed the storage component for the schemas, the user identity component for user profile and user identification, NLP component for processing the natural language query, these inputs may then be forwarded to a gremlin transpiler component (305). The gremlin transpiler component may be configured to process the inputs and explained in the earlier paragraphs, and create a base entity set. The gremlin transpiler component (305) can then use the base entity set and create the gremlin query as explained earlier.

In an example, the gremlin query may be forwarded to a graph database driver (306). The graph database driver may use the gremlin query and read the required graph database (307) on any platform, to fetch the data.

In an example, the graph database driver (306) may be configured to transmit the fetched data to the UI component. The UI component may be configured to display the data to the user using any appropriate display process and component.

In an example, the above components maybe microservice based and implemented as containers. The database accessing system can accordingly be hosted on any container orchestration service for instance Kubernetes, or on any public cloud service providers.

For the purpose of understanding, let us consider the below schema

```
type Vehicle
{
    vehicle_name: String
    vehicle_color: String
    issue_date: String
}
type Person
{
    person_name: String
    age: Int
    address: String
```

-continued

```
    cell_no: String
    vehicle_owned : [Vehicle] @relationship(name: "OWNED", direction: OUT)
}
type Query
{
    person: [Person]
    vehicle: [Vehicle]
}
```

This schema has two NODE attributes—Vehicle and Person. Person has 4 properties which are name, age, address, cell_no. Vehicle has 3 properties vehicle_name, vehicle_color, issue_date. Also there is one RELATION attribute—between Person and Vehicle, named "OWNED".

Let us consider the below user query.

```
person(filter: {name:"xyz"})
{
    name
    age
    address
    cell_no
    vehicle_owned(first: 2)
    {
        vehicle_color
        vehicle_name
        issue_date
    }
}
```

This query requests details of first two vehicles owned by person name "xyz".

Using the schema and the user query, the following base entity set may be created.

Node Attributes

Node attribute of the base entity set will have information regarding properties of node type like name, datatype, directives if any, alias name if any.

[name: age, type: "String"]
[name: person_name, type: "String"]
[name: address, type: "String"]
[name: vehicle_color, type: "String"]
[name: vehicle_name, type: "String"], etc....

Relation Attributes

Relation attribute of the base entity set will have information regarding relation type like name, type, relation properties, source node name, end node name, directives if any, alias name if any.

[name: vehicle_owned, type: Boolean for is list type or not, sourceNodeName: Person, endNodeName: Vehicle, arguments: [operation: First, value : 2] ]

Argument Attributes

Argument attribute of the base entity set will have Information regarding all filters, and pagination operators held by this argument.

[name: Filter, value: [Field: "person_name", value: "xyz"]]
This line explains that in query filter argument is applied on property called "person_name" with value "xyz".

The intermediate code will hold collection of all such base entities. Gremlin transpiler component will take the intermediate code, will iterate through these base entities and create equivalent sub parts and merge all parts together to generate final gremlin query.

Output Gremlin Query:
.V( ).hasLabel("Person").has("name",
"xyz").project("person").by(__.project("person_name", "age", "address",
"vehical_owned").by(__.values("person_name")).by(__.values("age")).by(__.values("
address")).by(__.out("OWNED").limit(2).project("vehicle_color",
"vehicle_name").by(__.values("vehicle_color")).by(__.values("vehicle_name")).fold(
)))

This query maybe prefixed by graph datasource name and can be directly consumed by gremlin graph database driver and will return data.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

We claim:

1. A method for converting graphql query into gremlin, comprising:
   creating schema of one or more gremlin supported graph databases;
   receiving as input the created schema and a data query for the one or more gremlin supported graph databases required by a user, wherein the data query by the user is a natural language query, and wherein the data query is converted to graphql data query;
   parsing the received schema and the graphql data query;
   mapping fields of the parsed schema and the parsed graphql data query, and identifying one or more entities based on the mapping; and
   creating a gremlin query using the one or more identified entities, wherein the gremlin query generation handles one or more filter arguments, filter operations, and pagination arguments.

2. The method of as claimed in claim 1, comprising:
   creating a graphql schema from the parsed schema; and
   creating an abstract syntax tree from the parsed graphql data query.

3. The method of claim 2, wherein the graphql schema and the abstract syntax tree are mapped.

4. The method of claim 1, comprising:
   creating a base entity set comprising one or more of node attribute, relation attribute, and argument attribute.

5. The method of claim 4, wherein the gremlin query is created using the base entity set.

6. A graph database accessing system for converting graphql query into gremlin, the system comprising:
   memory comprising programmed instructions stored thereon and one or more processors configured to execute the stored programmed instructions to:
   creating schema of one or more gremlin supported graph-databases;
   receiving as input the created schema and a data query for the one or more gremlin supported graph databases required by a user, wherein the data query by the user is a natural language query, and wherein the data query is converted to graphql data query;
   parsing the received schema and the received graphql data query;
   mapping fields of the parsed schema and the parsed graphql data query, and identifying one or more entities based on the mapping; and
   creating a gremlin query using the one or more identified entities, wherein the gremlin query generation is configured to handle one or more filter arguments, filter operations, and pagination arguments.

7. The system of claim 6, comprising:
   creating a graphql schema from the parsed schema; and
   creating an abstract syntax tree from the parsed graphql data query.

8. The system of claim 7, wherein the graphql schema and the abstract syntax tree are mapped.

9. The system of claim 6, comprising:
   a base entity set comprising one or more of node attribute, relation attribute, and argument attribute.

10. The system of claim 9, wherein the gremlin query is created using the base entity set.

11. A computer program product comprising a computer-readable storage media having computer-executable instructions stored thereupon, which when executed by a processor cause the processor to perform a method for converting graphql query into gremlin, comprising:
    creating schema of one or more gremlin supported graph databases;
    receiving as input the created schema and a data query for the one or more gremlin supported graph databases required by a user, wherein the data query by the user is a natural language query, and wherein the data query is converted to graphql data query;
    parsing the received schema and the received graphql data query;
    mapping fields of the parsed schema and the parsed graphql data query, and identifying one or more entities based on the mapping; and
    creating a gremlin query using the one or more identified entities, wherein the gremlin query generation is configured to handle one or more filter arguments, filter operations, and pagination arguments.

12. The computer program product of claim 11, comprising:
    creating a graphql schema from the parsed schema; and
    creating an abstract syntax tree from the parsed graphql data query.

13. The computer program product of claim 12, wherein the graphql schema and the abstract syntax tree are mapped.

14. The computer program product of as claimed in claim 11, comprising:
    a base entity set comprising one or more of node attribute, relation attribute, and argument attribute.

15. The computer program product of claim 14, wherein the gremlin query is created using the base entity set.

* * * * *